United States Patent
Chan et al.

(10) Patent No.: US 11,417,121 B1
(45) Date of Patent: *Aug. 16, 2022

(54) APPARATUS, SYSTEMS AND METHODS FOR CLASSIFYING DIGITAL IMAGES

(71) Applicant: STATE FARM MUTUAL AUTOMOBILE INSURANCE COMPANY, Bloomington, IL (US)

(72) Inventors: Aaron Scott Chan, Bloomington, IL (US); Kenneth Jason Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/735,198

(22) Filed: Jan. 6, 2020

Related U.S. Application Data (63) Continuation of application No. 14/994,308, filed on Jan. 13, 2016, now Pat. No. 10,565,460.

(60) Provisional application No. 62/102,672, filed on Jan. 13, 2015.

(51) Int. Cl.
| | |
|---|---|
| *G06V 20/59* | (2022.01) |
| *G06F 16/51* | (2019.01) |
| *G06K 9/62* | (2022.01) |
| *G06V 10/44* | (2022.01) |
| *G06V 10/75* | (2022.01) |
| *G06V 20/64* | (2022.01) |

(52) U.S. Cl.
CPC .............. *G06V 20/59* (2022.01); *G06F 16/51* (2019.01); *G06K 9/6267* (2013.01); *G06V 10/44* (2022.01); *G06V 10/751* (2022.01); *G06V 20/64* (2022.01)

(58) Field of Classification Search
CPC ............. G06K 9/00832; G06K 9/4604; G06K 9/00201; G06K 9/6202; G06K 9/6267; G06F 17/3028; G06F 16/51; G06T 7/004; G06V 20/59; G06V 20/64; G06V 10/751; G06V 10/44

See application file for complete search history.

(56) References Cited

U.S. PATENT DOCUMENTS

| | | | |
|---|---|---|---|
| 5,818,535 A | 10/1998 | Asnis et al. | |
| 7,659,827 B2 * | 2/2010 | Gunderson | G08G 1/16 348/148 |

(Continued)

OTHER PUBLICATIONS

E. Murphy-Chutorian and M. M. Trivedi, "Head Pose Estimation and Augmented Reality Tracking: An Integrated System and Evaluation for Monitoring Driver Awareness," in IEEE Transactions on Intelligent Transportation Systems, vol. 11, No. 2, pp. 300-311, Jun. 2010, doi: 10.1109/TITS.2010.2044241.*

(Continued)

*Primary Examiner* — Shaghayegh Azima
(74) *Attorney, Agent, or Firm* — Marshall, Gerstein & Borun LLP (57) ABSTRACT

The present disclosure is directed to apparatuses, systems and methods for automatically classifying images of occupants inside a vehicle. More particularly, the present disclosure is directed to apparatuses, systems and methods for automatically classifying images of occupants inside a vehicle by comparing current image feature data to previously classified image features.

20 Claims, 5 Drawing Sheets

(56) References Cited

U.S. PATENT DOCUMENTS

| | | | |
|---|---|---|---|
| 7,792,328 B2* | 9/2010 | Albertson | B60W 40/09 |
| | | | 701/1 |
| 8,441,548 B1* | 5/2013 | Nechyba | G06V 10/993 |
| | | | 348/222.1 |
| 8,527,146 B1* | 9/2013 | Jackson | B60W 50/0098 |
| | | | 180/287 |
| 8,606,492 B1* | 12/2013 | Botnen | G07C 5/008 |
| | | | 701/123 |
| 8,861,804 B1 | 10/2014 | Johnson et al. | |
| 8,930,072 B1* | 1/2015 | Lambert | B60R 1/00 |
| | | | 348/222.1 |
| 8,957,779 B2 | 2/2015 | Wu et al. | |
| 9,020,482 B2 | 4/2015 | Jones | |
| 9,081,999 B2 | 7/2015 | Baele et al. | |
| 9,104,535 B1* | 8/2015 | Brinkmann | G07C 5/085 |
| 9,117,246 B2* | 8/2015 | McClellan | G07C 5/008 |
| 9,428,052 B1* | 8/2016 | Raz | B60W 40/08 |
| 9,676,392 B1* | 6/2017 | Brinkmann | G06Q 40/08 |
| 9,690,292 B1 | 6/2017 | Chan et al. | |
| 9,710,717 B1 | 7/2017 | Sanchez et al. | |
| 9,886,637 B1 | 2/2018 | Chan et al. | |
| 9,944,296 B1 | 4/2018 | Sanchez et al. | |
| 9,990,554 B1 | 6/2018 | Sanchez et al. | |
| 10,013,620 B1 | 7/2018 | Sanchez et al. | |
| 10,089,542 B1 | 10/2018 | Chan et al. | |
| 10,140,533 B1 | 11/2018 | Chan et al. | |
| 10,147,007 B1 | 12/2018 | Chan et al. | |
| 10,147,008 B1 | 12/2018 | Chan et al. | |
| 10,189,480 B1 | 1/2019 | Sanchez et al. | |
| 10,229,333 B1 | 3/2019 | Sanchez et al. | |
| 10,241,512 B1 | 3/2019 | Chan et al. | |
| 10,325,167 B1 | 6/2019 | Chan et al. | |
| 10,562,536 B1 | 2/2020 | Sanchez et al. | |
| 10,565,460 B1 | 2/2020 | Chan et al. | |
| 10,607,095 B1 | 3/2020 | Chan et al. | |
| 10,958,987 B1 | 3/2021 | Hegar et al. | |
| 2003/0154190 A1 | 8/2003 | Misawa et al. | |
| 2004/0197014 A1 | 10/2004 | Oohashi | |
| 2004/0247192 A1 | 12/2004 | Kajiki et al. | |
| 2005/0046584 A1* | 3/2005 | Breed | G06F 3/0219 |
| | | | 340/13.31 |
| 2005/0073136 A1* | 4/2005 | Larsson | A61B 5/11 |
| | | | 180/272 |
| 2006/0013495 A1 | 1/2006 | Duan et al. | |
| 2006/0255241 A1 | 11/2006 | Shibao | |
| 2006/0267317 A1* | 11/2006 | Ida | B60N 2/4249 |
| | | | 280/730.2 |
| 2007/0120697 A1* | 5/2007 | Ayoub | B60R 11/0258 |
| | | | 348/95 |
| 2007/0135982 A1* | 6/2007 | Breed | G01G 19/4142 |
| | | | 701/36 |
| 2008/0130998 A1* | 6/2008 | Maidment | H04L 51/12 |
| | | | 707/E17.02 |
| 2008/0158357 A1 | 7/2008 | Connell et al. | |
| 2008/0169914 A1* | 7/2008 | Albertson | G08B 21/06 |
| | | | 340/425.5 |
| 2008/0212850 A1 | 9/2008 | Adachi et al. | |
| 2009/0180697 A1 | 7/2009 | Erol et al. | |
| 2010/0205012 A1* | 8/2010 | McClellan | G07C 5/008 |
| | | | 705/4 |
| 2010/0306373 A1 | 12/2010 | Wormley | |
| 2012/0028682 A1 | 2/2012 | Danne | |
| 2012/0252350 A1 | 10/2012 | Steinmetz et al. | |
| 2013/0030811 A1 | 1/2013 | Olleon et al. | |
| 2013/0166098 A1* | 6/2013 | Lavie | G07C 5/0808 |
| | | | 701/1 |
| 2013/0314429 A1 | 11/2013 | Croxford et al. | |
| 2014/0139451 A1 | 5/2014 | Levesque et al. | |
| 2014/0172467 A1* | 6/2014 | He | A61B 5/18 |
| | | | 705/4 |
| 2014/0210625 A1* | 7/2014 | Nemat-Nasser | G08B 21/06 |
| | | | 340/575 |
| 2014/0240132 A1* | 8/2014 | Bychkov | A61B 5/18 |
| | | | 340/576 |
| 2014/0256303 A1 | 9/2014 | Jones | |
| 2014/0257659 A1 | 9/2014 | Dariush | |
| 2014/0274023 A1 | 9/2014 | Rajeevalochana et al. | |
| 2014/0322676 A1* | 10/2014 | Raman | G09B 19/167 |
| | | | 434/65 |
| 2014/0375808 A1 | 12/2014 | Kao et al. | |
| 2015/0077237 A1* | 3/2015 | Chou | G06F 3/0484 |
| | | | 340/439 |
| 2015/0092056 A1* | 4/2015 | Rau | B60R 11/04 |
| | | | 348/148 |
| 2015/0095804 A1 | 4/2015 | Grossman et al. | |
| 2015/0161913 A1 | 6/2015 | Dominguez et al. | |
| 2015/0193885 A1* | 7/2015 | Akiva | G07C 5/0841 |
| | | | 705/4 |
| 2015/0314682 A1 | 11/2015 | Enriquez Ortiz | |
| 2016/0042543 A1* | 2/2016 | Hashimoto | H04N 5/265 |
| | | | 345/629 |
| 2016/0090041 A1 | 3/2016 | Nagasawa et al. | |
| 2016/0093212 A1* | 3/2016 | Barfield, Jr. | G08G 1/0133 |
| | | | 348/144 |
| 2016/0174132 A1 | 6/2016 | Hynes | |
| 2016/0241817 A1 | 8/2016 | Sun et al. | |
| 2017/0140293 A1* | 5/2017 | Vij | G06F 16/29 |
| 2017/0227841 A1 | 8/2017 | Niemela et al. | |
| 2019/0156150 A1 | 5/2019 | Krishnan | |
| 2021/0264179 A1 | 8/2021 | Sanchez et al. | |
| 2021/0284066 A1 | 9/2021 | Pedersen | |

OTHER PUBLICATIONS

Tran C., Trivedi M.M. (2011) Vision for Driver Assistance: Looking at People in a Vehicle. In: Moeslund T., Hilton A., Krüger V., Sigal L. (eds) Visual Analysis of Humans. Springer, London, 2011.*

Erik Murphy et al; ; "Head Pose Estimation and Augmented Reality Tracking: An Integrated System and Evaluation for Monitoring Driver Awareness"; IEEE 2010.*

Non-Final Office Action for U.S. Appl. No. 14/994,308 dated Sep. 7, 2017.

Final Office Action for U.S. Appl. No. 14/994,308 dated Feb. 26, 2018.

Non-Final Office Action for U.S. Appl. No. 14/994,308 dated Oct. 18, 2018.

Final Office Action for U.S. Appl. No. 14/994,308 dated May 15, 2019.

Notice of Allowance for U.S. Appl. No. 14/994,308 dated Oct. 18, 2019.

Non-Final Office Action for U.S. Appl. No. 15/964,209 dated Feb. 25, 2020.

Caird et al., A meta-analysis of the effects of texting on driving, Accident Analysis & Prevention, 71:311-8(2014).

Simons-Morton et al., Keep Your Eyes on the Road: Young Driver Crash Risk Increases According to Duration of Distraction, Journal of Adolescent Health, 54:561-7 (2014).

U.S. Appl. No. 15/964,209, Final Office Action, dated Jun. 15, 2020.

U.S. Appl. No. 15/964,209, Final Office Action, dated Mar. 30, 2021.

U.S. Appl. No. 15/964,209, Nonfinal Office Action, dated Dec. 15, 2020.

U.S. Appl. No. 16/797,009, Final Office Action, dated Nov. 18, 2021.

U.S. Appl. No. 16/797,009, Nonfinal Office Action, dated Jul. 12, 2021.

U.S. Appl. No. 17/039,916, Nonfinal Office Action, dated Oct. 26, 2021.

* cited by examiner

APPARATUS, SYSTEMS AND METHODS FOR CLASSIFYING DIGITAL IMAGES

CROSS REFERENCE TO RELATED APPLICATION

This application is a continuation of U.S. patent application Ser. No. 14/994,308, entitled APPARATUSES, SYSTEMS AND METHODS FOR CLASSIFYING DIGITAL IMAGES, filed Jan. 13, 2016, the disclosure of which is incorporated herein in its entirety by reference.

TECHNICAL FIELD

The present disclosure is directed to apparatuses, systems and methods for automatically classifying digital image features of occupants inside a vehicle. More particularly, the present disclosure is directed to apparatuses, systems and methods for automatically classifying digital image features of occupants inside a vehicle by comparing current image feature data to previously classified image feature data.

BACKGROUND

Vehicles are being provided with more complex systems. For example, vehicles commonly include a plethora of entertainment systems, such as stereos, USB interfaces for mobile telephones, video players, etc. Vehicles often have a host of other operator interfaces, such as emergency calling systems, vehicle navigation systems, heating and air conditioning systems, interior and exterior lighting controls, air bags, seatbelts, etc.

Vehicle operating environments are becoming more complex as well. For example, some roadways include u-turn lanes, round-a-bouts, no-left turn, multiple lanes one way in the morning and the other way in the afternoon, etc. Increases in traffic are also contributing to increased complexity.

These additional complexities contribute to increases in driver distractions. A great deal of innovation is taking place related to vehicle in-cabin devices for identifying driver distractions, and for reducing driver distractions.

What is needed are apparatuses, systems and methods for automatically classifying image features of occupants inside a vehicle. What is further needed are methods and systems for generating data representative of vehicle in-cabin insurance risk evaluations based on data representative of skeletal diagrams of a driver that are indicative of driver distractions.

SUMMARY

A vehicle in-cabin imaging device for generating data representative of at least one skeletal diagram of at least one occupant within an associated vehicle may include a processor and a memory. Previously classified image feature data may be stored on the memory. The previously classified image feature data may be representative of known image features of at least one vehicle interior. The vehicle in-cabin imaging device may also include at least one sensor for generating current image data. The current image data may be representative of current images of a vehicle interior. The vehicle in-cabin imaging device may further include a current image feature extraction module store on the memory that, when executed by the processor, may cause the processor to extract current image features data from the current image data. The current image feature data may be representative of current image features of the vehicle interior. The vehicle in-cabin imaging device may yet further include a current image feature classification module stored on the memory that, when executed by the processor, causes the processor to classify current image features of the interior of the vehicle based on a comparison of the current image feature data with the previously classified image feature data.

In another embodiment, a computer-implemented method for automatically classifying image features of an interior of a vehicle may include receiving previously classified image features data at a processor, from a remote computing device, in response to the processor executing a previously classified image features data receiving module. The previously classified image features data may be representative of known images of at least one vehicle interior. The method may also include extracting current image feature data, using the processor, from the current image data. The current image feature data may be representative of current image features of a vehicle interior. The method may also include receiving current image feature data at the processor, from at least one sensor. The current image feature data may be representative of current image features of a vehicle interior. The method may further include classifying current image features, using the processor, based on a comparison of the current image feature data with the previously classified image features data.

In a further embodiment, a non-transitory computer-readable medium storing computer-readable instruction that, when executed by a processor, may cause the processor to automatically classify image features of an interior of a vehicle. The non-transitory computer-readable medium may include a previously classified image features data receiving module that, when executed by a processor, causes the processor to receive previously classified image features data from a remote computing device. The previously classified image features data may be representative of known image features of at least one vehicle interior. The non-transitory computer-readable medium may further include a current image data receiving module that, when executed by a processor, causes the processor to receive current image data from at least one sensor. The current image data may be representative of current images of a vehicle interior. The non-transitory computer-readable medium may yet further include a current image feature data extraction module that, when executed by a processor, causes the processor to extract current image feature data from the current image data. The non-transitory computer-readable medium may also include a current image feature classification module that, when executed by a processor, causes the processor to classify current image features based on a comparison of the current image feature data with the previously classified image features data.

DETAIL DESCRIPTION

Apparatuses, systems and methods for acquiring images of occupants inside a vehicle may include using a vehicle in-cabin device that automatically classifies images of an interior of a vehicle. A vehicle in-cabin device may include features (e.g., a processor, a memory and sensors) that are configured to automatically acquire and classify images of the interior of a vehicle and occupants within the vehicle. For example, a memory may include computer-readable instructions stored thereon that, when executed by a processor, cause the processor to automatically receive inputs from various sensors, generate associated image data, and classify the image data. Accordingly, associated memory, processing, and related data transmission requirements are reduced compared to previous approaches. Accordingly, associated memory, processing, and related data transmission requirements are reduced compared to previous approaches.

Related methods and systems for generating data representative of vehicle in-cabin insurance risk evaluations may include, for example, the following capabilities: 1) determine whether a vehicle driver is looking at a road (i.e., tracking the driver's face/eyes, with emphasis on differentiating between similar actions, such as a driver who is adjusting a radio while looking at the road versus adjusting the radio while not looking at the road at all); 2) determine whether a driver's hands are empty (e.g., including determining an approximate size/shape of an object in a driver's hands to, for example, differentiate between a cell phone and a large cup, for example); 3) identify a finite number of vehicle occupant postures; and 4) vehicle occupant postures, that are logged, may be rotated and scaled to be normalized for a range of different drivers.

An associated mobile application may accommodate all computer system platforms, such as, iOS, Android and Windows, to connect a vehicle in-cabin device to, for example, a cell phone. In addition, to act as data connection provider to remote servers, the mobile application may provide a user friendly interface for reporting and trouble-shooting vehicle in-cabin device operation.

Figure 1A:
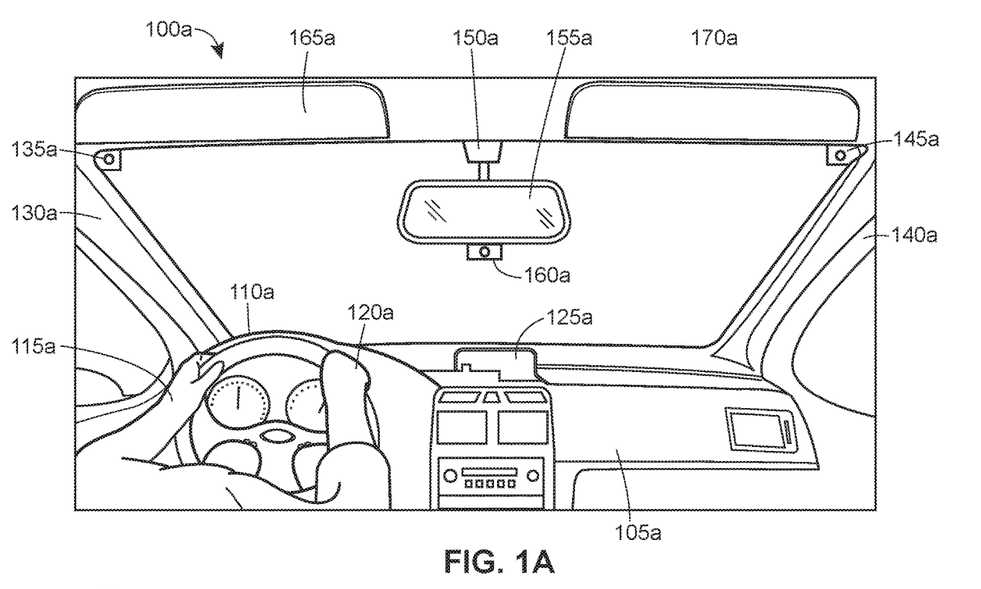
FIGS. 1A-1C depict various views of the interior of an example vehicle that illustrate locations of vehicle operator monitoring devices within the vehicle.
Figure 1B:
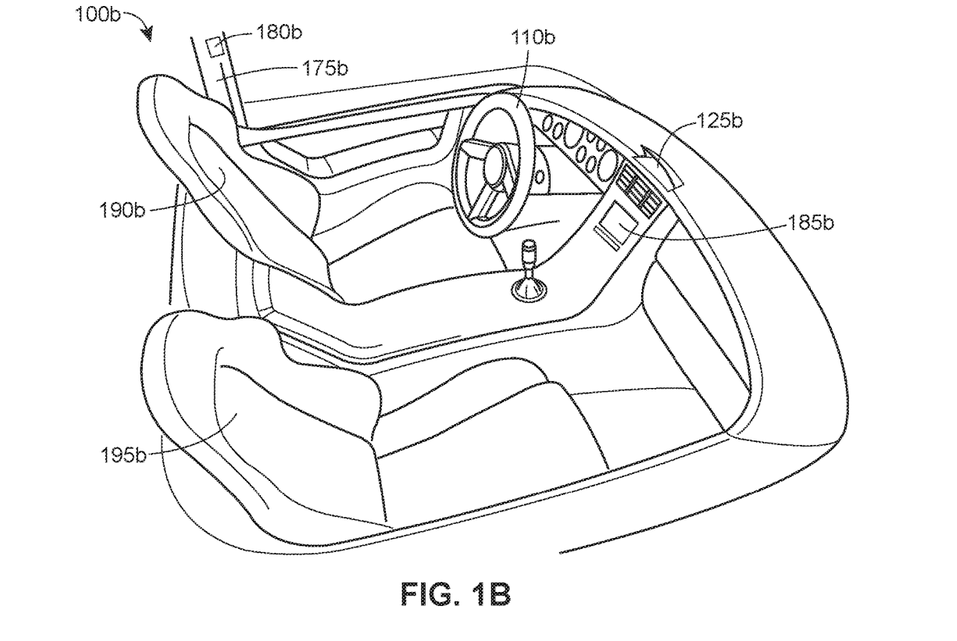
Figure 1C:
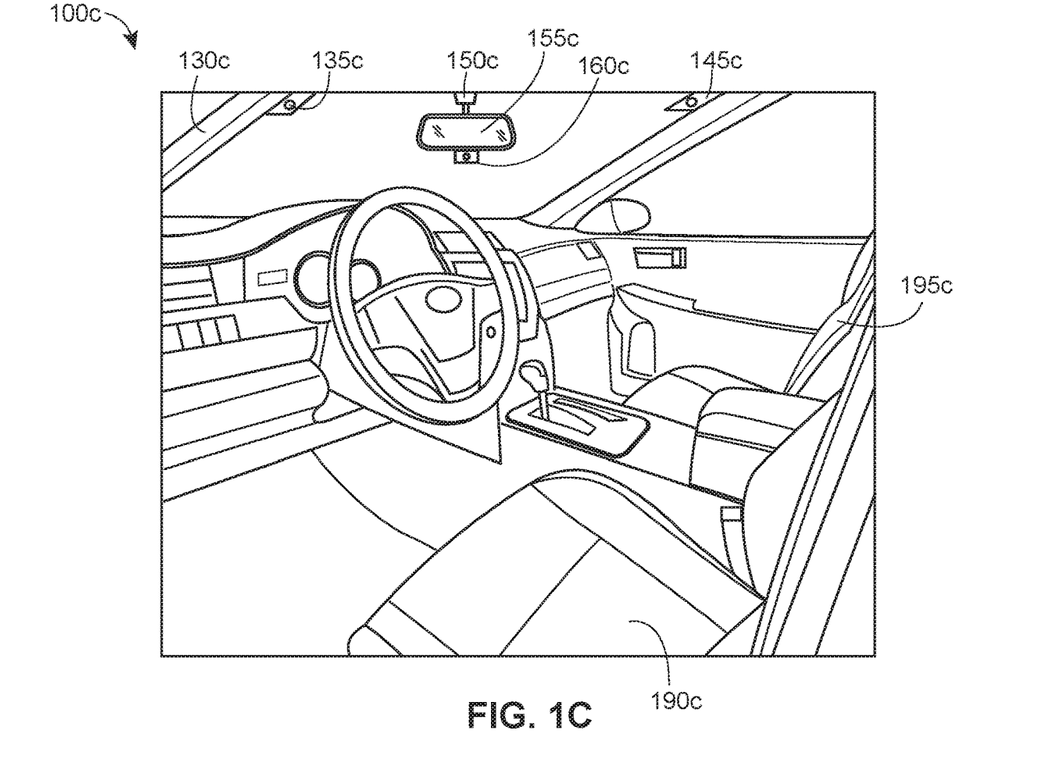

Turning to FIGS. 1A-1C, vehicle interior monitoring systems 100a, 100b, 100c are illustrated. As depicted in FIG. 1A, the vehicle interior monitoring system 100a may include a center-dash vehicle in-cabin device position 125a located in a center area of a dash, a driver-side A-pillar vehicle in-cabin device position 135a located in a driver side A-pillar 130a, a passenger-side A-pillar vehicle in-cabin device position 145a located in a passenger-side A-pillar 140a and a rearview mirror vehicle in-cabin device position 160a located on a bottom-side of the rearview mirror 155a. The vehicle interior monitoring system 100a may further, or alternatively, include vehicle in-cabin device positions in a driver-side visor 165a, a passenger-side visor 170a, a rearview mirror mounting bracket 150a and, or the steering wheel 110a. As described in detail herein, a position of a left-hand 115a of a vehicle driver and, or a position of a right-hand 120a of the vehicle driver, relative to, for example, a vehicle steering wheel 110a may be determined based on data acquired from any one of the vehicle in-cabin device positions 125a, 135a, 145a, 160a. Any one of the vehicle in-cabin device positions 125a, 135a, 145a, 160a may be automatically determined based on, for example, an input from an image sensor, an infrared sensor, an ultrasonic sensor, a compass sensor, a GPS sensor, a microphone or any other suitable sensor.

With reference to FIG. 1B, the vehicle monitoring system 100b may include a driver-side B-pillar vehicle in-cabin device position 180b located in a driver-side B-pillar 175b and a center-dash vehicle in-cabin device position 125b located in a center area of the dash. While not shown in FIG. 1B, the vehicle monitoring system 100b may include a passenger-side B-pillar vehicle in-cabin device position and, or any other vehicle in-cabin device position as described in conjunction with FIG. 1A. The vehicle monitoring system 100b may further include a display device 185b. The display device 185b may be located in, for example, a vehicle in-cabin device located in a center-console area. As illustrated in FIG. 1B, data acquired from the vehicle in-cabin device 125b, 180b may be used to automatically determine a location of the vehicle in-cabin device, a position of a driver-side seat 190b, a passenger-side seat 195b, a steering wheel 110b and, or at least a portion of a vehicle driver (not shown in FIG. 1B).

Turning to FIG. 1C, the vehicle interior monitoring system 100c may include a driver-side A-pillar vehicle in-cabin device position 135c located in a driver side A-pillar 130c, a passenger-side A-pillar vehicle in-cabin device position 145c located in a passenger-side A-pillar 140c and a rearview mirror vehicle in-cabin device position 160c located on a bottom-side of the rearview mirror 155c. The vehicle interior monitoring system 100c may further, or alternatively, include vehicle in-cabin device positions in a rearview mirror mounting bracket 150c and, or the steering wheel 110c. While not shown in FIG. 1C, the vehicle monitoring system 100c may include any other vehicle in-cabin device positions as described in conjunction with FIGS. 1A and 1B. As illustrated in FIG. 1C, data acquired from the vehicle in-cabin device position 135c, 145c may be used to automatically determine a location of the vehicle in-cabin device, a driver-side seat 190c, a passenger-side seat 195c, a steering wheel 110c and, or at least a portion of a vehicle driver (not shown in FIG. 1C).

Figure 2A:
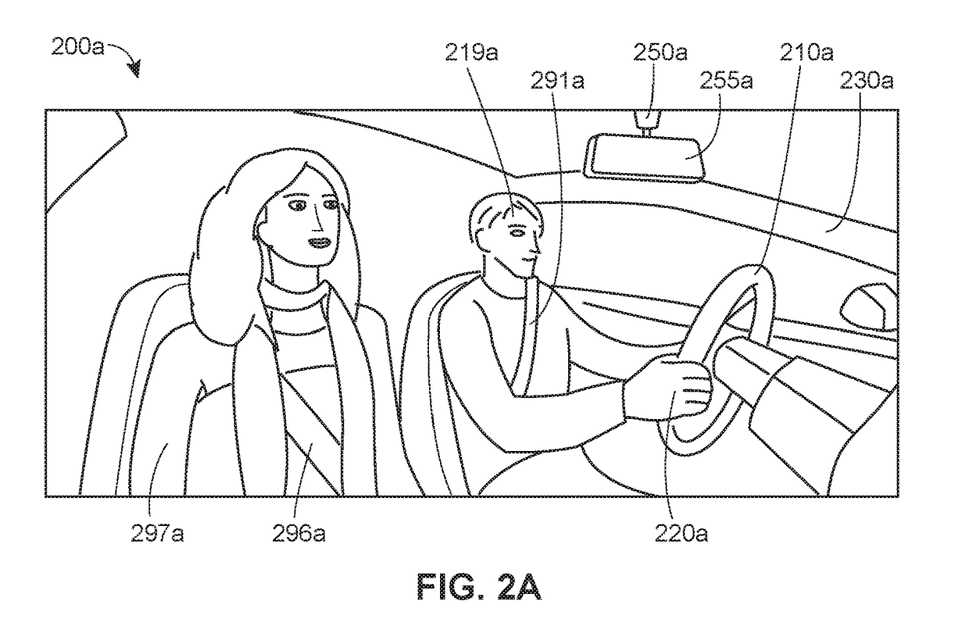
FIGS. 2A-2C illustrate various example images constructed from data retrieved from the vehicle monitoring devices of FIGS. 1A-1C.
Figure 2B:
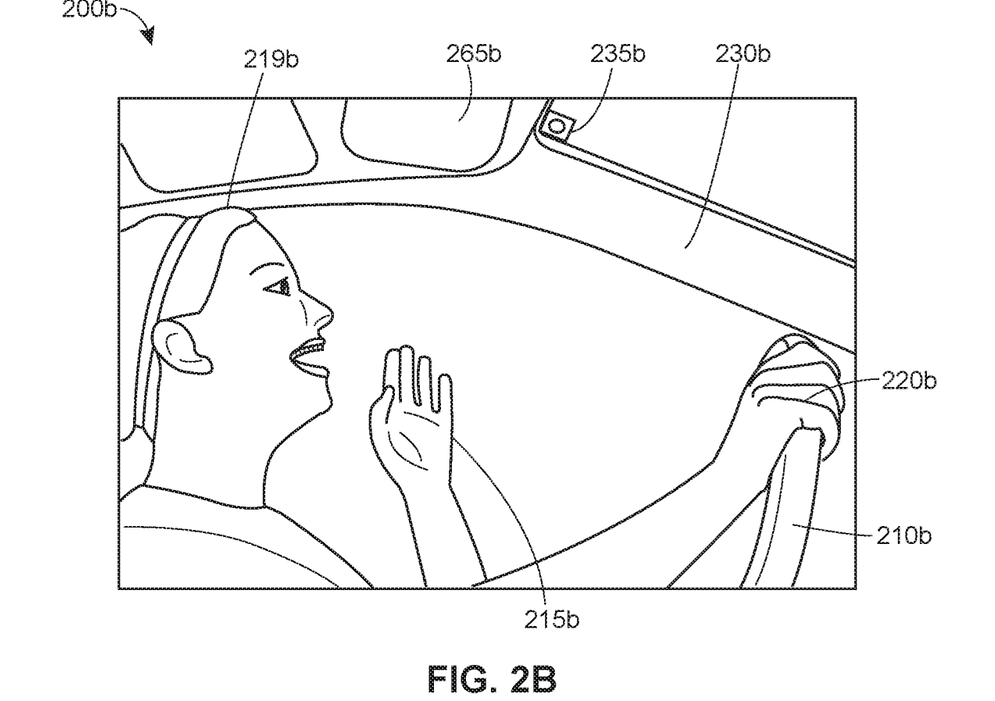
Figure 2C:
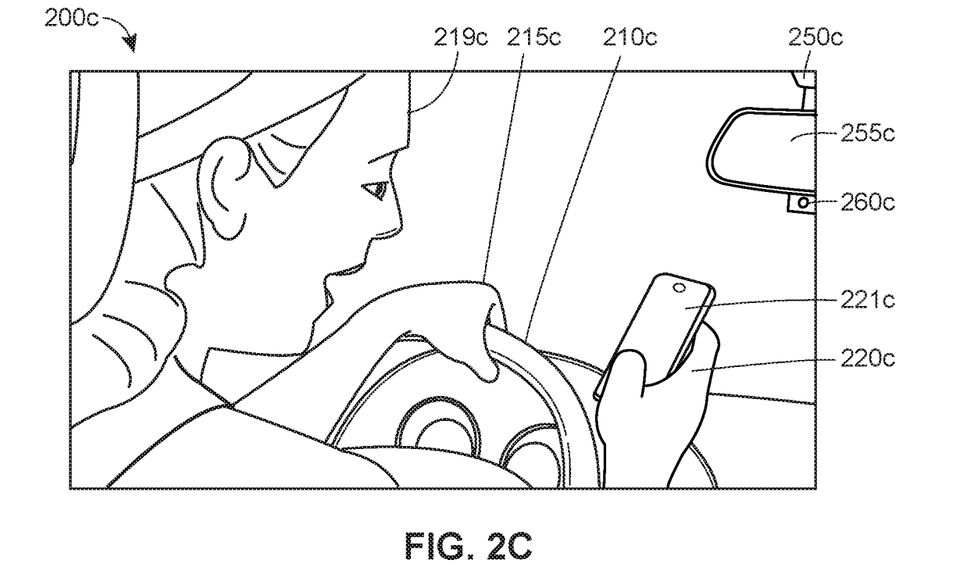

With reference to FIGS. 2A-2C, vehicle interiors 200a, 200b, 200c are depicted. As described in detail herein, data acquired from a vehicle in-cabin device 125a, 135a, 145a, 160a, 180b of FIGS. 1A and 1B (or any other suitably located vehicle in-cabin device) may be used to determine a position of at least a portion of a passenger 297a within the vehicle interior 200a. The data acquired from a vehicle in-cabin device 125a, 135a, 145a, 160a, 180b (or any other suitably located vehicle in-cabin device) may be used to determine whether, or not the passenger 297a is wearing a seatbelt 296a. As further illustrated in FIG. 2A, data acquired from a vehicle in-cabin device 125a, 135a, 145a, 160a, 180b of FIGS. 1A and 1B (or any other suitably located vehicle in-cabin device) may be used to determine a position and, or orientation of a vehicle driver's head 219a and, or right-hand 220a on a steering wheel 210a. For example, the data acquired from a vehicle in-cabin device 125a, 135a, 145a, 160a, 180b may be used to determine whether the vehicle driver's head 219a is oriented toward a rearview mirror 255a, oriented toward the driver-side A-pillar 230a or oriented toward the front windshield. The data acquired from the vehicle in-cabin device 125a, 135a, 145a, 160a, 180b may be used to determine whether the driver is wearing a seatbelt 291a. In any event, the vehicle interior 200a may include a vehicle in-cabin device having a microphone 250a located proximate the rearview mirror 255a. As described in detail herein, data acquired from the microphone 250a may be used to determine a source of sound within the vehicle interior 200a and, or a volume of the sound.

FIG. 2B depicts a vehicle interior 200b including a driver-side A-pillar vehicle in-cabin device position 235b located on a driver-side A-pillar 230b. The vehicle in-cabin device position may further, or alternatively, be located on a driver-side visor 265b. As described in detail herein, data acquired from the vehicle in-cabin device 235b (along with any other suitably located vehicle in-cabin device) may be used to determine a position and, or orientation of a driver's head 219b, the driver's left hand 215b and, or right hand 220b relative to the steering wheel 210b. For example, data acquired from the vehicle in-cabin device 235b (along with any other suitably located vehicle in-cabin device) may be used to determine a gesture that the driver is performing with her left hand 215b.

Turning to FIG. 2C, a vehicle interior 200b depicts a vehicle in-cabin device 260c located on a bottom side of a rearview mirror 255c opposite a rearview mirror mount 250c. As described in detail herein, data acquired from the vehicle in-cabin device 260c (along with any other suitably located vehicle in-cabin device) may be used to determine a position and, or orientation of a driver's head 219c, the driver's left hand 215c and, or right hand 220c relative to the steering wheel 210c. For example, data acquired from the vehicle in-cabin device 260c (along with any other suitably located vehicle in-cabin device) may be used to determine that the driver's head 219c is oriented toward a cellular telephone 221c in her right hand 220c. As also described in detail herein, a determination may be made that the driver is inattentive to the road based on the driver's head 219c being oriented toward the cellular telephone 221c.

Figure 3:
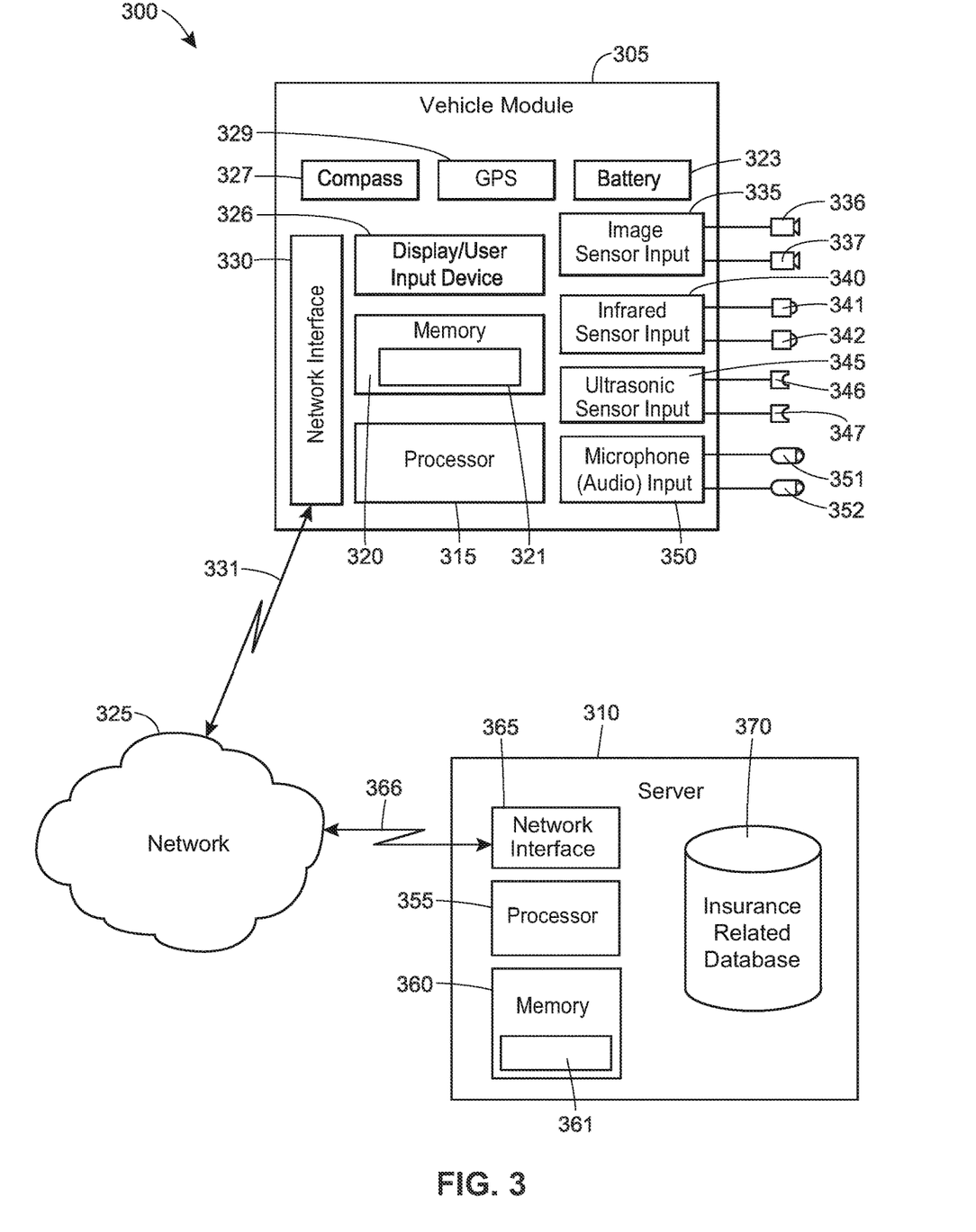
FIG. 3 illustrates a block diagram of a computer network, a computer server and an on-board vehicle computer on which an exemplary vehicle occupant monitoring system and method may operate in accordance with the described embodiments.

With reference to FIG. 3, a high-level block diagram of vehicle in-cabin system 300 is illustrated that may implement communications between a vehicle in-cabin device 305 and a remote computing device 310 (e.g., a remote server) to provide vehicle in-cabin device 305 location and/or orientation data, and vehicle interior occupant position data to, for example, an insurance related database 370. The vehicle in-cabin system 300 may acquire data from a vehicle in-cabin device (e.g., position sensors within a vehicle in-cabin device 125a, 135a, 145a, 160a, 180b of FIGS. 1A and 1B) and generate three dimensional (3D) models of vehicle interiors and occupants as depicted in FIGS. 2A-2C. The vehicle in-cabin system 300 may also acquire data from a microphone (e.g., microphone 250a of FIG. 2A) and determine a source of sound and volume of sound within a vehicle interior.

For clarity, only one vehicle in-cabin device 305 is depicted in FIG. 3. While FIG. 3 depicts only one vehicle in-cabin device 305, it should be understood that any number of vehicle in-cabin devices 305 may be supported. The vehicle in-cabin device 305 may include a memory 320 and a processor 315 for storing and executing, respectively, a module 321. The module 321, stored in the memory 320 as a set of computer-readable instructions, may be related to a vehicle interior and occupant position data collecting application that, when executed on the processor 315, causes vehicle in-cabin device location data to be stored in the memory 320. Execution of the module 321 may also cause the processor 315 to generate at least one 3D model of at least a portion of a vehicle occupant (e.g., a driver and/or passenger) within the vehicle interior. Execution of the module 321 may further cause the processor 315 to associate the vehicle in-cabin device location data with a time and, or date. Execution of the module 321 may further cause the processor 315 to communicate with the processor 355 of the remote computing device 310 via the network interface 330, the vehicle in-cabin device communications network connection 331 and the wireless communication network 325.

The vehicle in-cabin device 305 may also include a compass sensor 327, a global positioning system (GPS) sensor 329, and a battery 323. The vehicle in-cabin device 305 may further include an image sensor input 335 communicatively connected to, for example, a first image sensor 336 and a second image sensor 337. While two image sensors 336, 337 are depicted in FIG. 3, any number of image sensors may be included within a vehicle interior monitoring system and may be located within a vehicle interior as depicted in FIGS. 1A-1C. The vehicle in-cabin device 305 may also include an infrared sensor input 340 communicatively connected to a first infrared sensor 341 and a second infrared sensor 342. While two infrared sensors 341, 342 are depicted in FIG. 3, any number of infrared sensors may be included within a vehicle interior monitoring system and may be located within a vehicle interior as depicted in FIGS. 1A-1C. The vehicle in-cabin device 305 may further include an ultrasonic sensor input 345 communicatively connected to a first ultrasonic sensor 346 and a second ultrasonic sensor 347. While two ultrasonic sensors 346, 347 are depicted in FIG. 3, any number of ultrasonic sensors may be included within a vehicle interior monitoring system and may be located within a vehicle interior as depicted in FIGS. 1A-1C. The vehicle in-cabin device 305 may also include a microphone input 350 communicatively connected to a first microphone 351 and a second microphone 352. While two microphones 351, 352 are depicted in FIG. 3, any number of microphones may be included within a vehicle interior monitoring system and may be located within a vehicle interior as depicted in FIGS. 1A-1C. The vehicle in-cabin device 305 may further include a display/user input device 326.

As one example, a first image sensor 336 may be located in a driver-side A-pillar (e.g., location of position sensor 135a of FIG. 1A), a second image sensor 337 may be located in a passenger-side A-pillar (e.g., location of position sensor 145a of FIG. 1A), a first infrared sensor 341 may be located in a driver-side B-pillar (e.g., location of position sensor 180b of FIG. 1B), a second infrared sensor 342 may be located in a passenger-side B-pillar (not shown in the Figs.), first and second ultrasonic sensors 346, 347 may be located in a center portion of a vehicle dash (e.g., location of position sensor 125a of FIG. 1A) and first and second microphones 351, 352 may be located on a bottom portion of a vehicle interior rearview mirror (e.g., location of position sensor 160a of FIG. 1A). The processor 315 may acquire position data from any one of, or all of, these sensors 336, 337, 341, 342, 346, 347, 351, 352 and generate at least one 3D model (e.g., a 3D model of at least a portion of a vehicle driver) based on the position data. The processor 315 may transmit data representative of at least one 3D model to the remote computing device 310. Alternatively, the processor 315 may transmit the position data to the remote computing device 310 and the processor 355 may generate at least one 3D model based on the position data. In either event, the processor 315 or the processor 355 may retrieve data representative of a 3D model of a vehicle operator, and may compare the data representative of the 3D model of at least a portion of the vehicle driver with data representative of at least a portion of the 3D model vehicle operator. The processor 315 and, or the processor 355 may generate a vehicle driver warning based on the comparison of the data representative of the 3D model of at least a portion of the vehicle driver with data representative of at least a portion of the 3D model vehicle operator to warn the vehicle operator that his position is indicative of inattentiveness. Alternatively, the processor 315 and/or the processor 355 may generate an advisory based on the comparison of the data representative of the 3D model of at least a portion of the vehicle driver with data representative of at least a portion of the 3D model of a vehicle operator to advise the vehicle operator how to correct her position to improve attentiveness.

The network interface 330 may be configured to facilitate communications between the vehicle in-cabin device 305 and the remote computing device 310 via any hardwired or wireless communication network 325, including for example a wireless LAN, MAN or WAN, WiFi, the Internet, or any combination thereof. Moreover, the vehicle in-cabin device 305 may be communicatively connected to the remote computing device 310 via any suitable communication system, such as via any publicly available or privately owned communication network, including those that use wireless communication structures, such as wireless communication networks, including for example, wireless LANs and WANs, satellite and cellular telephone communication systems, etc. The vehicle in-cabin device 305 may cause insurance risk related data to be stored in a remote computing device 310 memory 360 and/or a remote insurance related database 370.

The remote computing device 310 may include a memory 360 and a processor 355 for storing and executing, respectively, a module 361. The module 361, stored in the memory 360 as a set of computer-readable instructions, facilitates applications related to determining a vehicle in-cabin device location and/or collecting insurance risk related data. The module 361 may also facilitate communications between the computing device 310 and the vehicle in-cabin device 305 via a network interface 365, a remote computing device network connection 366 and the network 325 and other functions and instructions.

The computing device 310 may be communicatively coupled to an insurance related database 370. While the insurance related database 370 is shown in FIG. 3 as being communicatively coupled to the remote computing device 310, it should be understood that the insurance related database 370 may be located within separate remote servers (or any other suitable computing devices) communicatively coupled to the remote computing device 310. Optionally, portions of insurance related database 370 may be associated with memory modules that are separate from one another, such as a memory 320 of the vehicle in-cabin device 305.

Figure 4:
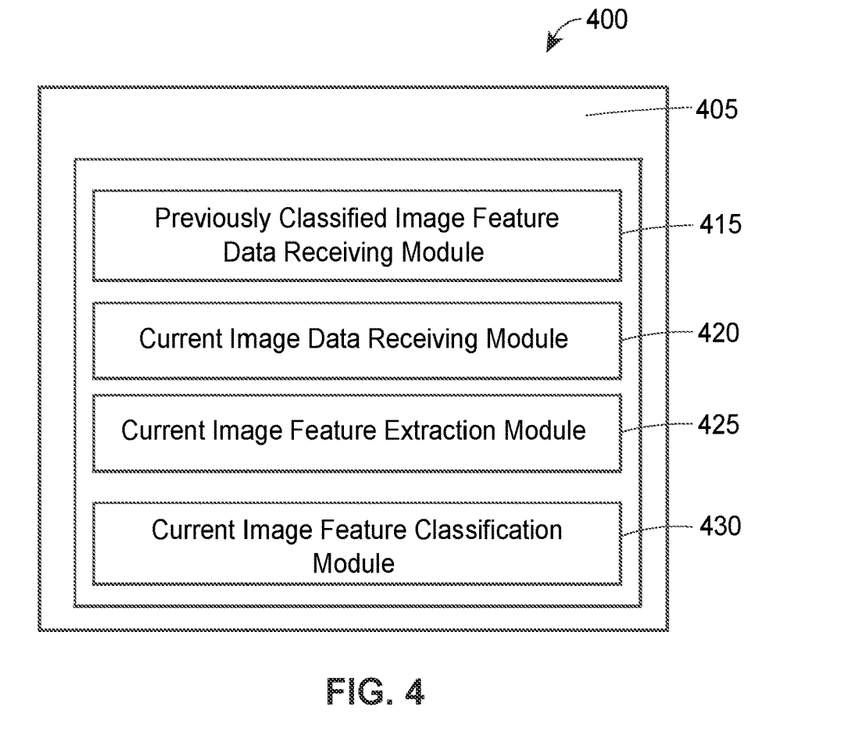
FIG. 4 illustrates a block diagram of an exemplary vehicle in-cabin imaging device for use in acquiring, analyzing, classifying, and transmitting image features of a vehicle interior.
Figure 5:
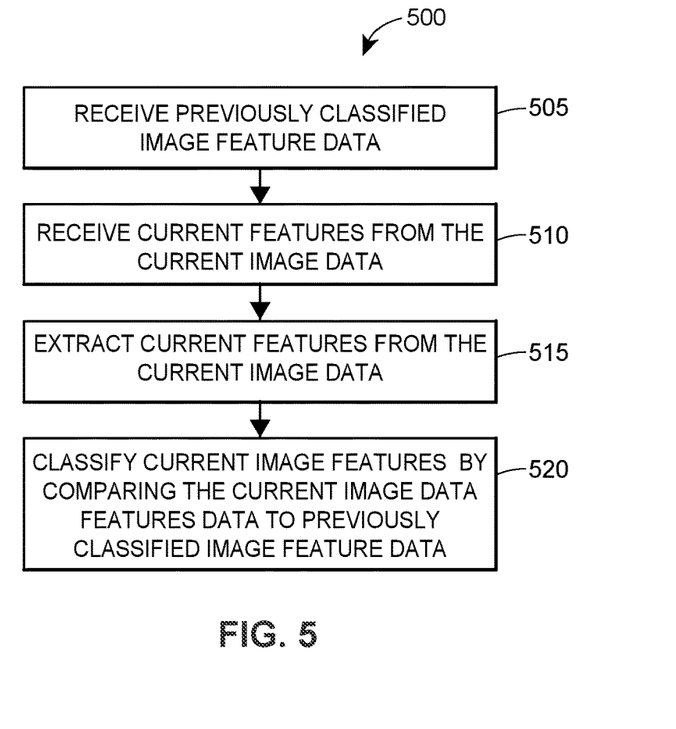
FIG. 5 depicts a flow diagram of an example method of acquiring, analyzing, classifying and transmitting image features of a vehicle interior.

Turning to FIGS. 4 and 5, a vehicle in-cabin device 405 of a vehicle in-cabin device data collection system 400 is depicted along with method 500 of automatically classifying image features of an interior of a vehicle and, or transmitting related data to a remote server 310. The vehicle in-cabin device 405 may be similar to the vehicle in-cabin device with insurance application 305 of FIG. 3. The method 500 may be implemented by executing the modules 415-430 on a processor (e.g., processor 315).

In any event, the vehicle in-cabin device 405 may include a previously classified image features data receiving module 415, a current image data receiving module 420, a current image feature extraction module 425, and a current image classification module 430 stored in a memory 420. The modules 415-430 may be stored in the memory 420 as a set of computer-readable instructions that, when executed by the processor 315, may cause the processor 315 to automatically classify images of an interior of a vehicle.

The processor 315 may execute the previously classified image features data receiving module 415 to, for example, cause the processor 315 to receive previously classified image features data (block 505). The previously classified image features data may be, for example, representative of images of interiors of vehicles that have been previously classified (e.g., vehicle occupant locations/orientations are known, cellular telephone locations/orientations are known, vehicle occupant eye locations/orientations are known, vehicle occupant head location/orientation is known, vehicle occupant hand location/orientation is known, a vehicle occupant torso location/orientation is known, a seat belt location is known, a vehicle seat location/orientation is known, etc.). The processor 315 may receive the previously classified image features data from, for example, an insurance related database 370 via a remote computing device 310.

The processor 315 may execute the current image data receiving module 420 to cause the processor 315 to, for example, receive current image data (block 510). The processor 315 may receive current image data from, for example, at least one of a compass sensor 327, a GPS sensor 329, an image sensor 336, 337, an infrared sensor 341, 342, an ultrasonic sensor 346, 347, and/or a microphone 351, 352. The current image data may be representative of images, and/or features (e.g., a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, a vehicle seat location/orientation, etc.) extracted from a respective image, of an interior of a vehicle.

The processor 315 may execute the current image feature data extraction module 425 to cause the processor 315 to, for example, extract current image feature data (block 515). The processor 315 may extract current image feature data from, for example, the current image data.

The processor 315 may execute the current image classification module 430 to cause the processor 315 to, for example, classify current image features of an interior of a vehicle (block 520). For example, the processor 315 may automatically classify current image features by comparing the previously classified image features data with the current image feature data. For example, the processor 315 may compare the current image feature data to a previously classified image features data, and may classify a current image the same as a previously classified image features when the processor 315 determines that the two images are similar.

A car-sharing insurance product could more specifically insure the driver, regardless of the car. Traditional underwriting looks at the driver-vehicle combination. What car-sharing would allow a company to do is to more heavily weight the risk of the driver alone. The methods and systems of the present disclosure may allow car-sharing to get that risk information on the driver and carry it forward to whatever car they use. This would be tailored for that particular driver's behavior, rather than demographic and vehicle-use factors. This may allow certain car-sharing entities to have a cost advantage. If the car-sharing entities are paying more or less for specific insurance, the car-sharing entities could pass those costs/savings to their customers and have a retention strategy.

The methods and systems of the present disclosure may allow for emergency responders by, for example, using gesture recognition systems from an aftermarket/insurance device in order to provide an estimate to first responders about the severity of the crash and what kinds of resources/equipment/expertise is required in order to extricate. Using the gesture recognition systems from an aftermarket/insurance device in order to provide an estimate to first responders about the severity of the crash and what kinds of resources/equipment/expertise is required in order to triage—have some idea of what emergency medical needs could be upon arrival. Since the "golden hour" is so critical, and it's not always known how much of that hour has already expired, even a preliminary or broad clue could be helpful in the triage process. The aftermarket gesture recognition device is already operating at the time of the crash. It is collecting data about the driver's position/posture and the location of the arms relative to the body and structures in the vehicle (i.e. the steering wheel). Accelerometers in the device are able to recognize that a crash has occurred (if a pre-determined acceleration threshold has been reached). Upon crash detection the device could transmit via the driver's phone (which is already connected via Bluetooth) or perhaps transmit using an onboard transmitter that uses emergency frequencies (and therefore does not require consumer to pay for data fees). Using gesture recognition from any original equipment or aftermarket gesture tracking device, whether or not for insurance purposes.

The methods and systems of the present disclosure may allow for Transition from Automated to Manual Driving Mode in the case of vehicle automation systems operating the piloting functions with the human in a supervisory role. For example, the vehicle may encounter a situation where control needs to be transferred to the driver, but the driver may or may not be ready to resume control. The methods and systems of the present disclosure may allow gesture recognition systems, or any gesture recognition system, to be used to determine if the driver is ready to resume control. If he/she is not ready, then get his/her attention quickly. The gesture recognition would be used to ascertain whether the driver is ready to resume control by evaluating the driver's posture, the location of hands, the orientation of head, body language. Use machine learning to evaluate driver engagement/attention/readiness-to-engage based on those variables. The gesture recognition could be any original in-vehicle equipment or aftermarket device.

The methods and systems of the present disclosure may distinguish between Automated and Manual driving modalities for variable insurance rating for a scenario where there are many vehicles that are capable of automatically operating the piloting functions, and are capable of the driver manually operating the piloting functions. The driver can elect to switch between automated and manual driving modes at any point during a drive. Gesture recognition would be utilized to distinguish whether a driver is operating the vehicle manually, or whether the vehicle is operating automatically. This could be determined through either OEM or aftermarket hardware. The sensors and software algorithms are able to differentiate between automatic and manual driving based on hand movements, head movements, body posture, eye movements. It can distinguish between the driver making hand contact with the steering wheel (to show that he/she is supervising) while acting as a supervisor, versus the driver providing steering input for piloting purposes. Depending on who/what is operating the vehicle would determine what real-time insurance rates the customer is charged.

The methods and systems of the present disclosure may provide a tool for measuring driver distraction where gesture recognition may be used to identify, distinguish and quantify driver distracted for safety evaluation of vehicle automation systems. This would be used to define metrics and evaluate safety risk for the vehicle human-machine interface as a whole, or individual systems in the case where vehicles have automation and vehicle-to-vehicle/vehicle-to-infrastructure communication capabilities. With Vehicle automation: the vehicle is capable of performing piloting functions without driver input. With Vehicle-to-vehicle/vehicle-to-infrastructure communication incorporated, the vehicle may be capable of communicating data about the first vehicle dynamics or environmental traffic/weather conditions around the first vehicle. For any entity looking to evaluate the safety or risk presented by a vehicle with automated driving capabilities, gesture recognition could be useful to quantify risk presented by driver distraction resulting from any vehicle system in the cabin (i.e. an entertainment system, a feature that automates one or more functions of piloting, a convenience system). With the rise of vehicle automation systems and capabilities, tools will be needed to evaluate the safety of individual systems in the car, or the car as a whole. Much uncertainty remains about how these systems will be used by drivers (especially those who are not from the community of automotive engineering or automotive safety). Determining whether they create a net benefit to drivers is a big question. The methods and systems of the present disclosure may allow gesture recognition to be used to identify the presence of distracted driving behaviors that are correlated with the presence of vehicle automation capabilities. The distracted driver could be quantified by duration that the driver engages in certain behaviors. Risk quantification may also be measured by weighting certain behaviors with higher severity than other behaviors, so the duration times are weighted. Risk quantification may also differentiate subcategories of behaviors based on degree of motion of hands, head, eyes, body. For example, the methods and systems of the present disclosure may distinguish texting with the phone on the steering wheel from texting with the phone in the driver's lap requiring frequent glances up and down. The latter would be quantified with greater risk in terms of severity of distraction. The purpose of this risk evaluation could be for reasons including but not limited to adhering to vehicle regulations, providing information to the general public, vehicle design testing or insurance purposes.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A vehicle in-cabin imaging device for classifying image features associated with at least one occupant within an associated vehicle, the vehicle in-cabin imaging device comprising:
   at least one vehicle interior sensor for acquiring vehicle interior data, wherein the vehicle interior data is representative of at least one image sequence of at least one vehicle occupant;
   a vehicle interior data normalization module stored on a memory that, when executed by a processor, causes the processor to generate normalized vehicle occupant data based on the vehicle interior data, wherein the normalized vehicle occupant data is representative of vehicle occupant postures normalized for a range of different drivers;
a feature extraction module stored on the memory that, when executed by the processor, causes the processor to extract three-dimensional coordinate spatial locations of at least a portion of at least one vehicle occupant from the normalized vehicle occupant data; and
a feature classification module stored on the memory that, when executed by the processor, causes the processor to classify the three-dimensional coordinate spatial locations of the at least the portion of the at least one vehicle occupant into a respective driver behavior, wherein classification of the three-dimensional coordinate spatial locations of at least the portion of the at least one vehicle occupant determines one of an approximate size and shape of an object in the vehicle occupant's hands, including whether a hand of the vehicle occupant is empty.

2. The vehicle in-cabin imaging device as in claim 1, wherein the at least one vehicle interior sensor is selected from: at least one digital image sensor, at least one ultrasonic sensor, at least one radar-sensor, at least one infrared light sensor, or at least one laser light sensor.

3. The vehicle in-cabin imaging device as in claim 1, wherein the three-dimensional coordinate spatial locations of the at least the portion of at least one vehicle occupant within the vehicle interior are representative of the at least one skeletal diagram.

4. The vehicle in-cabin imaging device as in claim 3, wherein the vehicle interior skeletal diagram data is representative of an orientation of at least a portion of at least one vehicle occupant within the vehicle interior.

5. The vehicle in-cabin imaging device as in claim 1, wherein the vehicle interior data is representative of a three-dimensional location of at least a portion of at least one occupant within the vehicle interior and an orientation of the portion of the at least one vehicle occupant.

6. The vehicle in-cabin imaging device as in claim 1, wherein the vehicle occupant data representative of vehicle occupant postures includes one or more of a hand location/orientation, an arm location/orientation, an elbow location/orientation and a torso location/orientation of the vehicle occupant.

7. The vehicle in-cabin imaging device as in claim 1, wherein the vehicle interior data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

8. A computer-implemented method for automatically classifying images of a vehicle interior, the method comprising:
receiving, at the processor, previously classified image features data from a remote computing device, in response to the processor executing a previously classified image features data receiving module, wherein the previously classified image features data is representative of known image features of at least one vehicle interior;
receiving current image data, at the processor, from at least one sensor, wherein the current image data is representative of current images of a vehicle interior;
generating normalized vehicle occupant data, based on the current image data, in response to the processor executing a vehicle interior data normalization module, wherein the normalized vehicle occupant data is representative of vehicle occupant postures normalized for a range of different drivers; and
classifying current image features, using the processor, based on the normalized vehicle occupant data and a comparison of the current image feature data with the previously classified image features data, wherein classification of the current image features determines one of an approximate size and shape of an object in a hand of a vehicle occupant, including whether the hand of the vehicle occupant is empty.

9. The method of claim 8, wherein the current image feature data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

10. The method of claim 8, wherein the previously classified image features data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

11. The method of claim 8, wherein the current image feature data is representative of one of: (1) a three-dimensional location of at least one vehicle occupant within the vehicle interior; and (2) an orientation of at least a portion of at least one vehicle occupant within the vehicle interior.

12. The method of claim 8, wherein the vehicle occupant data representative of vehicle occupant postures includes one or more of a hand location/orientation, an arm location/orientation, an elbow location/orientation and a torso location/orientation.

13. The method of claim 8, wherein the current image feature data is representative of a three-dimensional location of at least a portion of at least one occupant within the vehicle interior and an orientation of the portion of the at least one vehicle occupant.

14. A non-transitory computer-readable medium storing computer-readable instruction that, when executed by a processor, cause the processor to automatically classify image features of an interior of a vehicle, the non-transitory computer-readable medium comprising:
a previously classified image features data receiving module that, when executed by the processor, causes the processor to receive previously classified image features data from a remote computing device, wherein the previously classified image features data is representative of known image features of at least one vehicle interior;
a current image data receiving module that, when executed by the processor, causes the processor to receive current image data from at least one sensor, wherein the current image data is representative of current image of a vehicle interior;
a vehicle interior data normalization module that, when executed by the processor, causes the processor to generate normalized vehicle occupant data based on the current image data, wherein the normalized vehicle occupant data is representative of vehicle occupant postures normalized for a range of different drivers; and a current image feature classification module that, when executed by the processor, causes the processor to classify current image features based on the normalized vehicle occupant data and a comparison of the current image feature data with the previously classified image features data, wherein classification of the current image features determines one of an approximate size and shape of an object in a vehicle occupant's hands, including whether a hand of the vehicle occupant is empty.

15. The non-transitory computer-readable medium of claim 14, wherein the current image feature data is representative of a three-dimensional location of at least a portion of at least one occupant within the vehicle interior and an orientation of the portion of the at least one vehicle occupant.

16. The non-transitory computer-readable medium of claim 14, wherein the current image feature data is representative of an orientation of at least a portion of at least one vehicle occupant within the vehicle interior.

17. The non-transitory computer-readable medium of claim 14, wherein the current image feature data is representative of a three-dimensional location of at least one vehicle occupant within the vehicle interior.

18. The non-transitory computer-readable medium of claim 14, wherein the current image feature data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

19. The non-transitory computer-readable medium of claim 14, wherein the previously classified image features data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

20. The non-transitory computer-readable medium of claim 14, wherein the at least one sensor is selected from: at least one digital image sensor, at least one ultra-sonic sensor, at least one radar-sensor, at least one infrared light sensor, or at least one laser light sensor.

\* \* \* \* \*